UNITED STATES PATENT OFFICE.

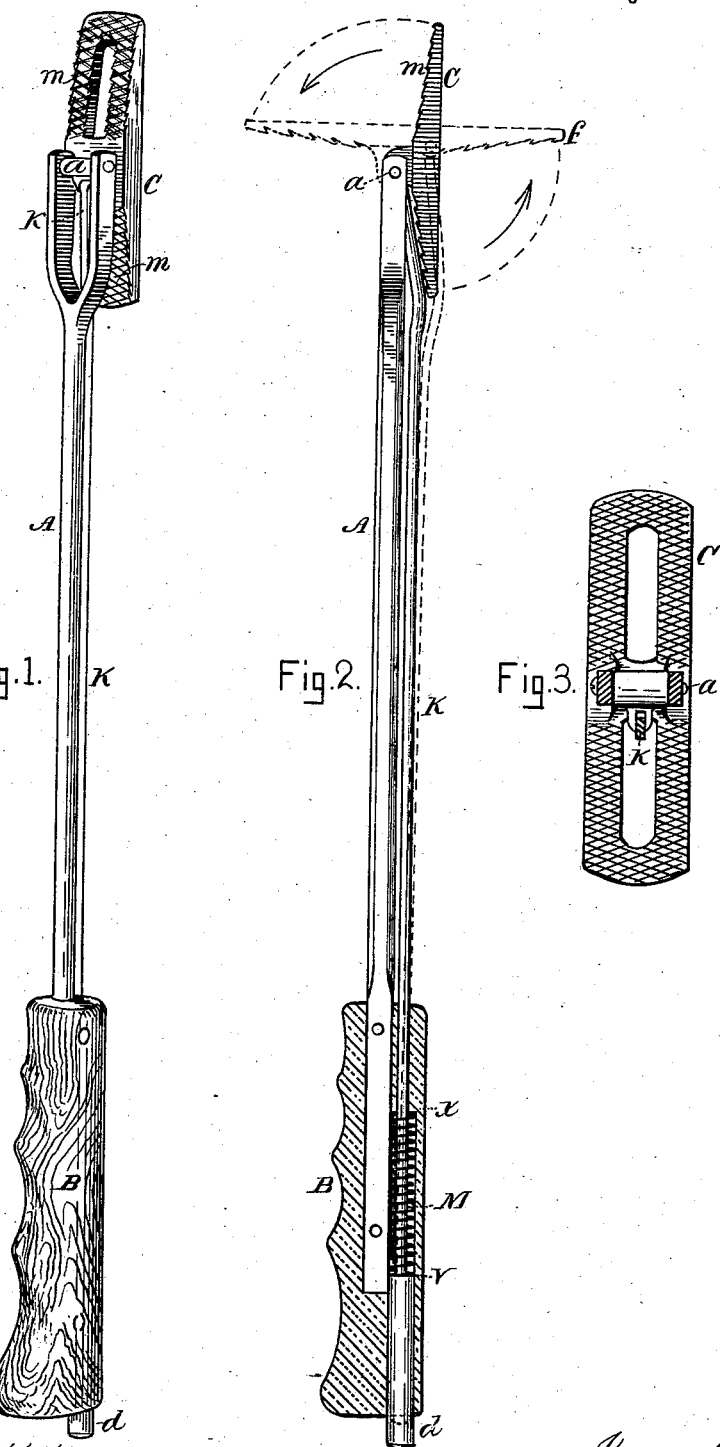

STEPHEN SLATER, OF NORTH SMITHFIELD, RHODE ISLAND.

CRANIAL TRACTOR.

SPECIFICATION forming part of Letters Patent No. 261,394, dated July 18, 1882.

Application filed June 2, 1882. (No model.)

*To all whom it may concern:*

Be it known that I, STEPHEN SLATER, of North Smithfield, in the county of Providence and State of Rhode Island, have invented a certain new and useful Improvement in Cranial Tractors, of which the following is a description sufficiently full, clear, and exact to enable any person skilled in the art or science to which said invention appertains to make and use the same, reference being had to the accompanying drawings, forming a part of this specification, in which—

Figure 1 is an isometrical perspective view, representing the tractor closed; Fig. 2, a longitudinal sectional view, and Fig. 3 a view of the bar detached.

Like letters of reference indicate corresponding parts in the different figures of the drawings.

My invention relates to that class of tractors which are employed in obstetrics for performing the surgical operation known as "craniotomy;" and it consists in a novel construction and arrangement of parts, as hereinafter more fully set forth and claimed, by which a more effective device of this character is produced than is now in ordinary use.

In the drawings, A represents the body, B the handle, and C the bar.

The handle is bifurcated at its outer end, and pivoted or journaled therein at $a$ is a flat cross bar or lever, C, provided on one of its sides with a series of inwardly-inclined teeth or serrations, $m\ m$.

A sliding rod, K, arranged parallel to the body A, is jointed at its outer end to the inner face of the bar C, near the journal $a$, its opposite end working in a hole in the handle B and projecting therefrom, as shown at $d$.

Disposed within the handle, and arranged around the rod K, there is a coiled spring, M, acting expansively, one end abutting against the shoulder $v$ on the rod and the other against a rabbet or shoulder, $x$, formed in the handle, the spring thus acting constantly to keep the bar folded or closed, as seen in Fig. 1.

In the use of my improvement, the tractor being closed or the bar C arranged in the position shown in Figs. 1 and 2, the implement is inserted in the aperture or hole made by the cranial perforator—an instrument which is used preparatory to using the tractor. The rod K is then pushed forward by the projecting end $d$, causing the bar to assume a position at right angles to the body A, as shown by the dotted lines $f$, in which position it is held by the rod and the implement withdrawn, bringing out the parts grasped by the bar in a manner which will be readily understood by all conversant with such matters without a more explicit description.

The object attained by constructing the teeth $m$ "hooking," or in having them incline toward the journal $a$, as shown, is to prevent the parts of the fetus being withdrawn or extracted from slipping over the ends of the bar, and thus escaping from the grasp of the tractor.

It will be obvious that the spring M may be dispensed with, if desired, and also that the teeth $m$ may be straight instead of inclined, without entirely departing from the spirit of my improvement.

Having thus explained my invention, what I claim is—

The improved cranial tractor described, the same consisting of the body A, handle B, pivoted toothed rack-bar C, rod K, and spring M, constructed and arranged to operate substantially as and for the purpose set forth.

STEPHEN SLATER.

Witnesses:
WM. H. SANDFORD,
LOUIS E. REMINGTON.